PETER A. BUTTON
L. DALE GREEN
ARMAND R. TANGUAY
INVENTORS

BY Allen E. Botney
ATTORNEY

INVENTORS
PETER A. BUTTON
L. DALE GREEN
ARMAND R. TANGUAY
BY Allen E. Bohney
ATTORNEY

PETER A. BUTTON
L. DALE GREEN
ARMAND R. TANGUAY
INVENTORS

BY Allen E. Bohney

ATTORNEY

United States Patent Office 3,308,233

Patented Mar. 7, 1967

3,308,233

XEROGRAPHIC FACSIMILE PRINTER HAVING LIGHT BEAM SCANNING AND ELECTRICAL CHARGING WITH TRANSPARENT CONDUCTIVE BELT

Peter A. Button, Arcadia, and Leland Dale Green and Armand R. Tanguay, Pasadena, Calif., assignors, by mesne assignments, to Xerox Corporation, Rochester, N.Y., a corporation of New York Filed Sept. 16, 1963, Ser. No. 309,215
12 Claims. (Cl. 178—6.6)

The present invention relates to facsimile systems in general and more particularly relates to a facsimile printer based on xerographic techinques.

Facsimile is the name given to a way of sending pictures and handwritten or printed material by wire or radio. News services often use facsimile to transmit news to newspapers and television stations. Banks, railroads, and other organizations have adopted facsimiles for business purposes. Small newspapers have been published experimentally by facsimile. Facsimile is made possible because radio currents can be modified by light as well as by sound. Any change in the waves caused by light at the sending station will be reproduced at the receiving station.

According to an earlier form of facsimile which is still in widespread use today, a picture to be sent is placed in a revolving cylinder at the sending station. A tiny beam of light is then passed back and forth over the picture. The beam of light is reflected onto a photoelectric cell that changes light waves into electric current. When the light ray strikes the lighter parts of the picture, more of the ray is reflected, and the photoelectric cell sends out a stronger current. When the light ray strikes a dark part of the picture, less light is reflected, and the photoelectric cell sends out a weaker current. In this way, the light and dark places of the picture are reproduced in terms of electric current. This varying electric current is transmitted to a distant receiving station by modulating a carrier signal with it. When the signal current is reproduced at the receiving set, it passes from a printer blade through damp, chemically treated paper to a wire that is wound around a revolving cylinder. The chemicals in the paper react as the current passes from the blade through the paper to the wire. A strong current makes a dark spot, and a weak current produces a lighter spot. The different degrees of black and white in the picture are thereby reproduced on the paper.

More recent facsimile equipment is operated in the same basic manner but uses flying-spot scanning methods instead. More specifically, in the printer, a very small spot of light on the face of a cathode-ray tube is made to sweep in one dimension. The photosensitive paper, on the other hand, moves in a direction that is perpendicular to the sweep line, thereby producing a raster. The intensity of the light spot is varied or modulated in order to produce light and dark areas on the photosensitive or output copy paper. The same type of scanning system is used in the transmitting equipment. The light from a flying-spot scanner is projected onto the copy to be transmitted. The reflected light is then converted to a video signal with a photomultiplier tube. Of course, the two flying-spot scanners are synchronized together as is the input copy in the transmitter and the photosensitive material in the receiver.

The present invention involves the dual concept of employing xerographic methods in a facsimile printer together with an optical system that is used only to create a raster scan and which is not an integral part of the information transfer. Xerography, briefly stated, is a dry printing process that uses static electricity. More specifically, it involves the formation of an electrostatic image on an insulating photoconductive surface by exposure of the uniformly-charged layer to light. This latent image is then developed by allowing it to collect finely-divided powder particles which are later transferred to a permanent support, such as a sheet of paper, for example. Finally, the powder image is fixed to the support by the most appropriate of several means such as heating, softening by solvent vapor, or spraying the image with transparent lacquer.

A facsimile printer according to the present invention includes a conductive drum coated with a highly insulating photoconductive material such as amorphous selenium, an induction device, an light-scanning system. The purpose of the light-scanning system is to move an extremely small spot of light of constant intensity laterally across the surface of the drum at a high rate. The induction device consists of a layer of transparent conductor bonded to a layer of transparent insulator. These two layers are flexible and are formed into an endless belt. The belt is made to come into intimate contact with the selenium for a small area in such a way that the transparent insulator makes contact with the drum and the transparent conductor is separated from the selenium surface by the insulator. The light-scanning system is set so that the spot of light passes through the flexible belt in the area where the belt makes contact with the photoconductor surface.

In its operation, a voltage corresponding to a video signal is established between the metal drum on which the selenium photoconductor is deposited and the transparent conductor in the belt induction device. In the area of contact, the transparent conductor of the belt forms a capacitor with the metal on which the selenium is coated. When light strikes the photoconductor, it turns from an insulator to a partial conductor and allows charges to flow to its surface. When the spot of light moves, the area of the photoconductor where the spot was originally becomes an insulator again and charges become trapped on the photoconductor surface. When the belt is removed from the photoconductor surface, the trapped charges remain and can be developed using normal electrostatic development methods of the type mentioned briefly above. As the spot of light is moved laterally across the drum, the voltage between the conductors change, thereby depositing varying amounts of charge according to the video signal. The combined rotation of the drum and the lateral scan of the spot of light form a raster on the drum. With proper synchronization of the scanning device, the drum rotation, and the video signal, a latent electrostatic facsimile image can be deposited on the surface of the selenium drum.

An alternative of the above system is one where the charge migration is in the same direction as is normally encountered in xerography. Before the induction belt comes in contact with the selenium surface, a positive charge is deposited on the selenium photoconductor surface. Then, when the belt is in contact with the selenium surface and when the spot of light strikes a certain area, a voltage of the correct polarity which is established between the conductor on the belt and the metal backing of the selenium photoconductor will establish a field which will hold some of the positive charges in position on the selenium surface. When the light is moved to another area, the remaining charges will be trapped on the selenium surface. The amount of trapped charges in any particular area will again depend on the established voltage or electric field when light was striking that area. This alternative method is different from the first in that in the first method, positive charges were made to move from the metal plate on which the selenium surface was deposited, through to the surface of the selenium. In this method, positive charges on the selenium surface move to the metal backing plate when light strikes that particular area, unless an electric field tending to hold them on the selenium surface has been established by the induction device. Electric fields causing the motion of charges or holes in the selenium are inherently stronger in the alternative approach than they are in the first approach in that the voltage difference establishing the field exists only across the selenium layer instead of the combined insulator-selenium layer.

As can be seen, the operating principles of a printer according to the present invention are quite different than those in the prior art, the primary difference being that even though a flying-spot scan system is employed, there is no intensity modulation of the spot of light.

Instead, the spot is used only as a switching mechanism. More particularly, because the light spot is not modulated, the cathode-ray tube usually associated with flying-spot scanners can be replaced by a mechanical scanning system. This fact in itself offers several advantages over conventional methods. These advantages include faster writing speeds due to more intense light sources, smaller spot diameter over a wider printing width, and very good scan stability offering good spatial precision in the output copy. A smaller spot size means greater resolution in the generated latent image and high spatial precision makes color facsimile transmission quite feasible in that the separate color images, when combined, could have very good registration.

The novel features which are believed to be characteristic of the invention, both as to its organization and method of operation, together with further objects and advantages thereof, will be better understood from the following description considered in connection with the accompanying drawings in which an embodiment of the invention is illustrated by way of example. It is to be expressly understood, however, that the drawings are for the purpose of illustration and description only and are not intended as a definition of the limits of the invention.

FIGURE 2(*b*) illustrates a portion of a selenium-coated drum used in the printer system of FIG. 1;

FIGURE 2(*c*) shows the belt and drum combination of FIGS. 2(*a*) and 2(*b*), respectively, together with rollers in conductive contact with the belt;

FIGURE 7(*b*) is a top view of the belt in FIG. 7(*a*); and

Figure 1:
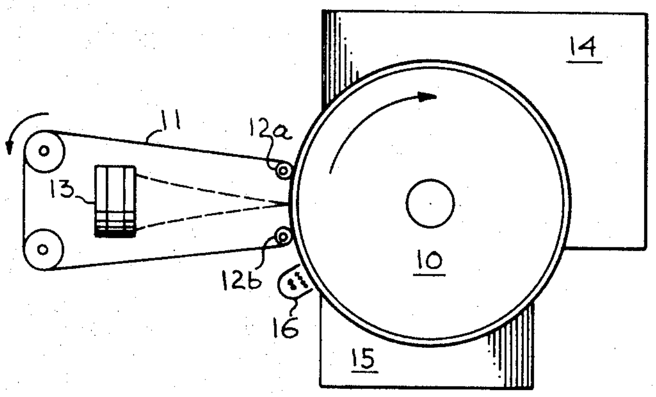
FIGURE 1 is a schematic presentation of a facsimile printer according to the present invention.
Figure 8A:
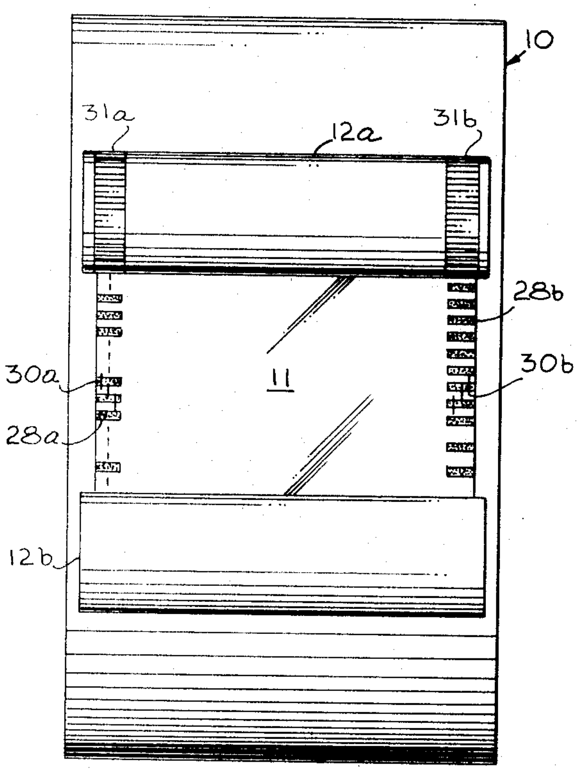
Figure 8B:
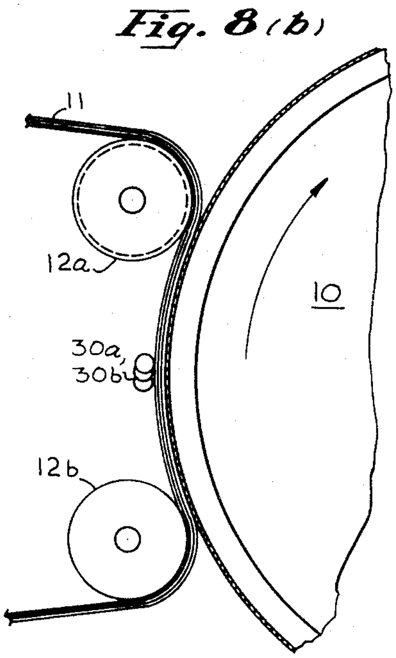

FIGURES 8(*a*) and 8(*b*) are respectively top and side views of several of the basic elements of the FIG. 1 system as modified, and includes the drum, belt and pressure rollers.

Considering now the drawings, reference is made in particular to FIG. 1 wherein the facsimile printer is shown to basically include a conductive drum 10 that is coated with a highly insulating photoconductive material, such as amorphous selenium; an endless and transparent flexible belt 11 that is maintained in firm contact with the surface of the drum by means of a pair of presure rollers **12*a* and 12*b*; an optical or light-scanning system 13; development and print-out equipment 14; a drum cleaner 15 and, if required, a charging device 16**.

Considering the printer elements delineated above in somewhat greater detail, endless belt 11 includes a transparent conductive coating **11*a*, such as tin oxide, sandwiched between a transparent dielectric material 11*b* and a transparent backing layer 11*c* that provides strength and protection. Also included in the belt construction for reasons that will be more apparent later are contact strips 11*d* and 11*e* made of a metal, such as gold, and these would be located along the edges of the belt flush with backing layer 11*c*, as is shown in the figure. With respect to selenium-coated drum 10**, this is a standard well-known element and, hence, need not be described in any detail here. Suffice it, therefore, to show a small cross-sectional portion of the drum in FIG. 2(*b*) wherein the drum is shown to comprise a metal cylinder **10*a* whose surface is coated with a selenium layer 10*b*, the selenium-cylinder combination constituting the xerographic surface. As may be expected, drum 10** is mounted on a shaft journaled in a frame to rotate in the direction indicated by the arrow to cause the drum surface sequentially to pass a plurality of xerographic processing stations.

Figure 2A:
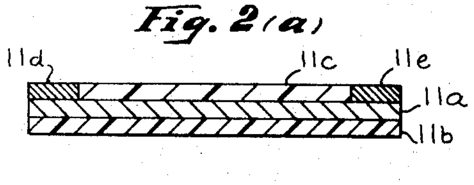
FIGURE 2(*a*) shows a cross-sectional view of a transparent belt used in the printer system of FIG. 1.
Figure 2B:
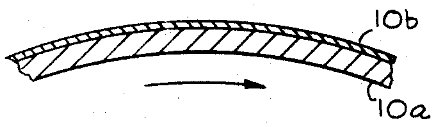
Figure 2C:
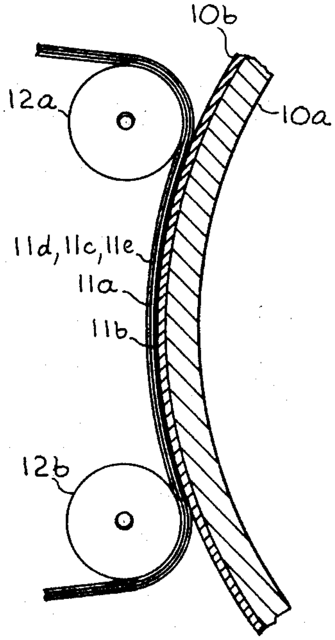

The mechanical relationship between drum 10 and belt 11 is clearly illustrated in FIG. 2(*c*) wherein the belt is shown in intimate contact with a relatively small surface area of the selenium layer, the desired contact being provided by means of pressure rollers **12*a* and 12*b* which, as their name implies, applies a predetermined pressure to the belt to provide, as the belt moves along, tight and uniform mating between the belt and drum surfaces. It may be said that the belt-drum combination is basically a moving capacitor, the belt containing one plate of the capacitor (conductive coating 11*a*) and the drum providing the other capacitor plate (metal cylinder 10*a*), dielectric layer 11*b* and photoconductive layer 10*b*** lying between these two plates.

Figure 3:
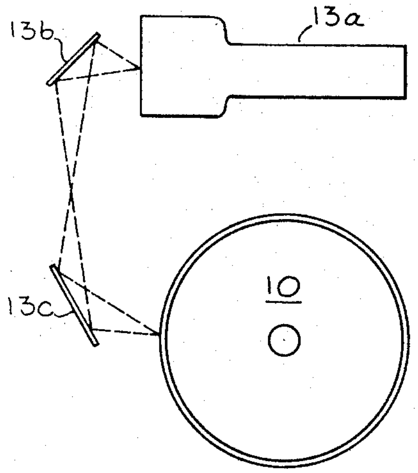
FIGURE 3 illustrates apparatus that may be used to provide the desired optical scan in the printer system of FIG. 1.

Optical scanning system 13 in FIG. 1 is shown in greater detail in FIG. 3, the purpose of the optical system being to produce a spot of light which is to be linearly scanned across the selenium-coated drum in a direction parallel to the drum's axis of rotation. The three main design criteria of the optical system is that the length of scan of the light spot must be equal to the width of the copy that is to be printed, the size of the light spot must be smaller than the eye can resolve at the minimum distance of distinct vision, and the light spot flux must be such that, at the desired frequency of the facsimile printer and surface exposure to the selenium, the selenium becomes sufficiently conducting so that charges will flow and become trapped on its free surface. The optical system shown in FIG. 3 includes a flying-spot scanner **13*a* and a couple of mirrors 13*b* and 13*c*** which reflect the moving spot of light onto the photoconductor layer. However, as was previously mentioned, a mechanical scanning system may be substituted to a very great advantage. Basically, such a mechanical system would employ a light source, a single lens and a rotating reflecting polygon which would be located immediately behind the lens. The radiant energy would pass through the lens twice, once on its way from the light source to the reflecting polygon and the second time on its way from the polygon surface to the drum where it would be focused by the lens as a tiny spot of light on the photoconductor surface. The light traces would be produced in response to the movement of the polygon sides, which movement would cause the angle of incidence and reflection to change.

As for development and print-out equipment 14 and drum cleaner 15, equipment 14 is that portion of the printer system that produces a visible record of the desired latent image and cleaner 15 is that portion of the system that thereafter cleanses the drum by removing any residual development material that may have been left on its surface, thereby making it ready for the next cycle of operation. By way of example, drum cleaner 15 may be a pair of rapidly-revolving fur brushes and may also include a discharge lamp installed between these brushes and charging device 16 for the purpose of removing any residual charges from the selenium surface before it is reused.

Drum cleaner apparatus of the kind that may easily be adapted for use in the facsimile printer of the present invention can be found in the patent to L. E. Walkup et al., entitled, "Electrostatic Cleaning of Xerographic Plates." Patent No. 2,752,271 issued June 26, 1956 or in the patent to M. I. Turner, Jr., et al., entitled, "Brush Cleaning Device," Patent No. 2,751,616 issued June 26, 1956. Similarly, development and print-out equipment can be found in the patent to R. G. Vyverberg entitled, "Xerographic Machine," Patent No. 2,885,955 issued May 12, 1959 or in the patent to H. O. Ulrich entitled, "Xerographic Development Electrode Apparatus," Patent No. 3,011,474 issued December 5, 1963.

As was previously indicated, charging device 16 may be used if needed and examples of charging devices that could be adapted for use can be found in the patent to R. W. Gundlach entitled, "Xerographic Charging Device," Patent No. 2,790,082 issued April 23, 1957 or in the patent to L. E. Walkup entitled "Charging Device," Patent No. 2,879,395 issued Apri 24, 1959.

Figure 4:
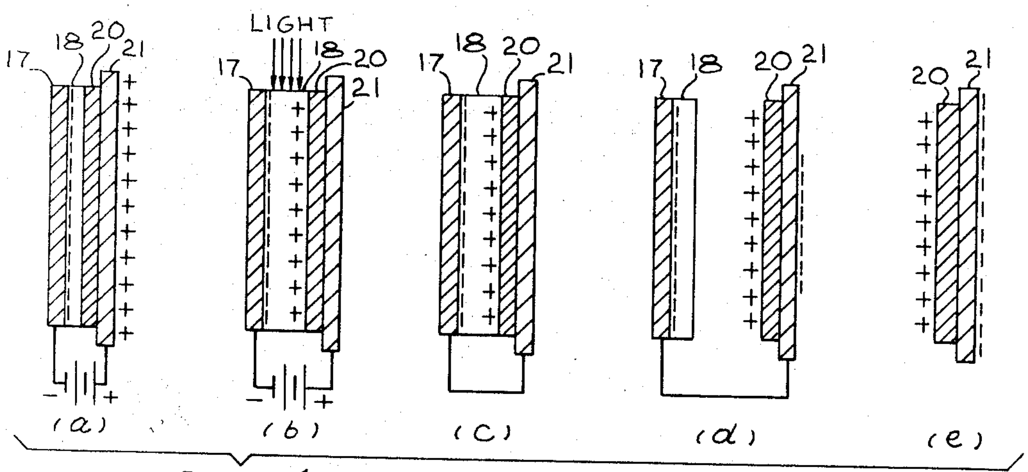
FIGURES 4–6 illustrate the underlying principles that govern the operation of the present invention.

The underlying operating principles of the present invention may be explained by the simplified arrangement illustrated in FIG. 4 to which reference is now made. In FIG. 4(*a*), an induction plate 17 is initially separated by an insulator 18 from a layer of selenium 20 deposited on a conducting substrate 21. The process is started with the application of a voltage across the two conducting plates 17 and 21 for, under the influence of the resulting electric field, positive charges will migrate from conducting substrate 21 to the free surface of selenium layer 20 when the latter is illuminated. This step is depicted in FIG. 4(*b*). Upon removal of the light from the photoconductor, as is shown in FIG. 4(*c*), the charges become trapped on the selenium free surface. The separation of the plates thereafter and the resulting migration of negative charges are depicted by the functional steps given in FIGS. 4(*d*) and 4(*e*). A standard process is then employed for the development of the latent image trapped on the surface of layer 20.

Considering now the operation of the FIG. 1 system, a carrier signal containing the desired information is demodulated in a conventional manner to produce a variable voltage, hereinafter referred to as an analog signal, that is applied between drum cylinder **10*a* and pressure rollers 12*a* and 12*b*. Since rollers 12*a* and 12*b* are conductively in contact with conductive strips 11*d* and 11*e* which, in turn, are conductively in contact with conductive layer 11*a*, the voltage is actually applied between drum cylinder 10*a* and transparent conductive layer 11*a*. As was previously explained, in the area of contact between drum 10 and belt 11, the transparent conductor of the belt forms a capacitor with the drum metal on which the selenium is coated. As was also previously explained, when a spot of light directed at transparent belt 11 in the abovesaid area of contact passes through it to strike selenium layer 10*b*, the selenium at the point of incidence turns from an insulator to a partial conductor and allows charges to flow to its surface. Consequently, as the spot of light produced by optical system 13** is moved laterally across the belt and drum, the voltage and, therefore, the electric field between the conductors change, thereby causing varying amounts of charge to become deposited on the selenium surface. When the belt and drum move out from under the spot of light, the selenium loses its conductive quality so that the charges that have migrated to is surface are trapped and remain thereon. It will thus be recognized that the combined rotation of the drum and the lateral scan of the spot of light form a raster on the drum, with the result that a complete latent electrostatic facsimile image is ulimately deposited on the surface of the selenium drum.

As drum 10 rotates, this latent image passes to development and print-out equipment 14 wherein it is processed to produce a visible image on paper. The drum then passes alongside drum cleaner apparatus 15 which, as heretofore mentioned, cleans the selenium surface and thereby prepares it for reuse.

Figure 5:
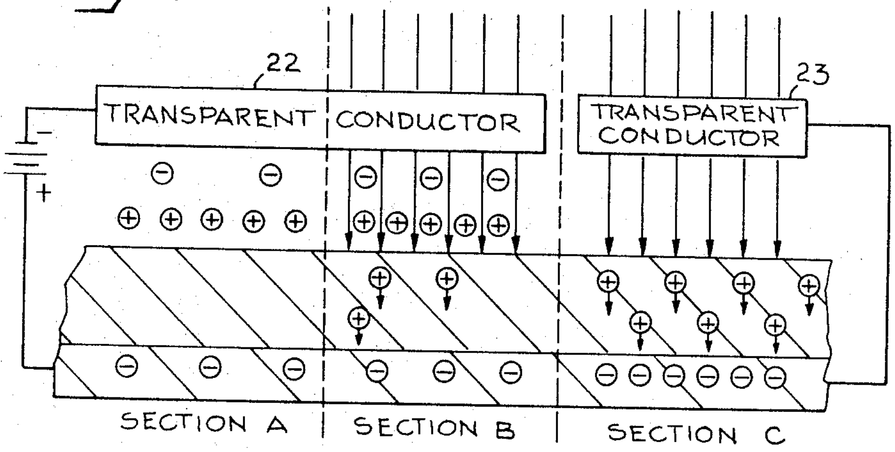

In the induction method described above, positive charges are made to move from the metal drum cylinder to the surface of the selenium layer. However, a charge induction deposition method which depends on positive charges moving in the same direction as they do in the standard xerographic process, namely, toward the conducting drum cylinder, may also be used in the printer system of FIG. 1 and the basic principles of such an alternative approach are illustrated in FIG. 5. More particularly, the selenium surface is charged by a positive ion source before the process begins. FIG. 5 shows two transparent conductors 22 and 23 spaced very close to the selenium surface beneath them. The transparent conductor above the selenium surface in sections A and B, namely, conductor 22, is at a high negative potential, while conductor 23 in section C is at ground potential. When light is present on the selenium surface, as in sections B and C, the positive charges are dissipated in the usual xerographic manner. However, in section B, a strong electric field exists in both the selenium film and the air gap and this field has the effect of retaining some of the positive charges on the surface of the selenium. In section C, on the other hand, all or substantially all of the positive charges have left the selenium surface and moved to the metal substrate beneath. Since there is no light in section A, none of the positive charges are dissipated.

The printer using this method would use the same physical equipment as the induction printer discussed before in connection with FIG. 1, with the exception of a charging device 16 which would be added before the scanning station to deposit a positive charge on the selenium drum. The latent image produced on the drum with this technique would have the same polarity as one produced by the prior induction process. However, such a technique would have the advantage of producing a better response time, thereby allowing much higher scanning speeds and video signal rates.

Due to the negative charge on the belt, the positive charge distribution on the photoconductor surface may to some extent be adversely affected during separation of the belt from the photoconductor surface. To avoid the possibility of any attenuation of charge and the image degradation that might result, the facsimile printer in FIG. 1 may be modified so as to apply a positive voltage to the induction plate prior to separation, thereby strengthening the latent image on the selenium surface. One series of modifications that may be made is illustrated in FIGS. 7 and 8.

Figure 7A:
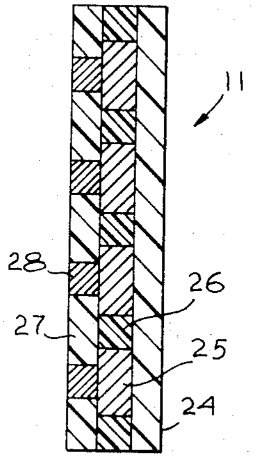
FIGURE 7(*a*) is a cross-sectional view of a new belt configuration to be used in a modified version of the FIG. 1 system.
Figure 7B:
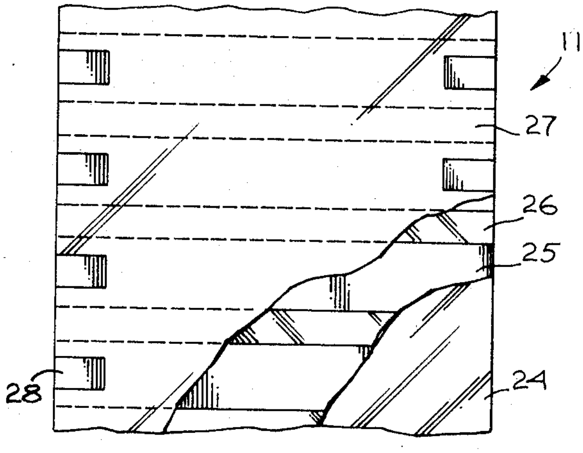

In FIGS. 7(*a*) and 7(*b*), a segmented belt 11 is shown which, as modified, comprises a transparent dielectric layer 24 over which is mounted a second layer made up of transparent conductive segments 25 narrowly separated from each other by similar segments 26 of a transparent and highly-resistive material. More specifically, as may be seen from the figures, segments 25 and 26 are rectangular-shaped and extend transversely across the belt, with the highly-resistive segments being positioned on either side of the conductive segments for the purpose of electrically isolating them from each other. As before, a transparent belt-backing layer 27 is mounted or deposited over this second layer, a plurality of conductive contact elements 28 being embedded in it along the edges thereof, the elements along one edge being designated **28*a* and those along the other edge being designated 28*b***. As shown in FIGS. 7(*a*) and 7(*b*), contact elements 28 are equally spaced from each other and are respectively superimposed upon transparent conductive segments 25. Thus, contact elements 28 are in physical and, therefore, electrical contact with conductive segments 25, with the result that signals applied to elements 28 are also applied to segments 25.

In order to apply these signals, a plurality of metal wheels 30 are provided, as shown in FIGS. 8(*a*) and 8(*b*), for the purpose of making contact with elements 28, half the number of these wheels, designated 30*a*, being mounted along one edge of belt 11 and in contact with elements 28*a* and the other half, designated 30*b*, being mounted along the other edge and in contact with elements 28*b*. In the embodiment illustrated, a total of six contact wheels are used and, therefore, three contact wheels are located on either side of the belt at exactly opposite points thereon. In each group, the contact wheels are spaced slightly from each other and staggered so that at least one contact wheel therein is at all times in contact with a conductive element 28. Stated differently, as the belt moves along, each pair of corresponding elements 28 will, in turn, move into contact with wheels 30. Thus, contact wheels 30 are arranged so that as each segment of the belt moves into the plane of the scanning light spot, the contact wheels will impose the analog voltage onto that segment of the conductive coating that is then being scanned.

Because of the requirements of charge reversal in general and the modifications to belt 11 in particular, pressure rollers 12 are likewise modified, as is shown in FIGS. 8(*a*) and 8(*b*) wherein the entire combination of drum 10, belt 11 and rollers 12, as modified, are shown. Thus, pressure roller 12*a* is modified to include a pair of conductive contacting surfaces 31*a* and 31*b* that respectively mate with contact elements 28*a* and 28*b*. Consequently, any potential applied to roller 12*a* will be applied through its contacting surfaces 31 and through elements 28 to the segment 25 then beneath the roller. On the other hand, roller 12*b* remains unchanged from its previous construction and function.

Figure 6:
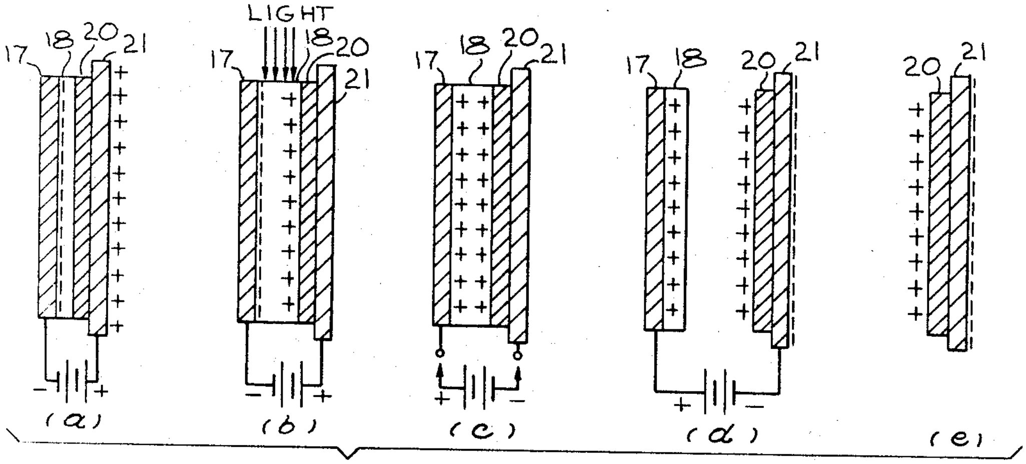

Before considering the operation of this modified printer system, it would once again be worthwhile to understand the underlying principles involved. Accordingly, reference is made to FIG. 6 wherein the FIG. 4 arrangement comprising induction plate 17, insulator 18, selenium layer 20 and conducting substrate 21 is reproduced in FIG. 6(*a*). With the application of a voltage between conducting plates 17 and 21 and the establishment of an appropriate electric field therebetween, positive charges will flow from substrate 21 to the free surface of selenium layer 20 when the latter is illuminated, as is depicted in FIG. 6(*b*). It will now be noted from FIG. 6(*c*) that after the radiation has been removed from the photoconductor surface, the polarity of the applied voltage is reversed, that is to say, during the separation process a positive potential is applied to the inductor and a negative potential is applied to the substrate. The functional step of separation and voltage reversal is presented in FIG. 6(*d*). The final result shown in FIG. 6(*e*) is that obtained in the original process but improved due to the prevention of latent image attenuation.

Considering now the operation of the modified embodiment in FIGS. 7 and 8, the analog signal is applied between drum cylinder 10*a* and contact wheels 30 and, therefore, is applied between the drum cylinder and the conductive segment 25 then beneath the contact wheels. Simultaneously, the constant intensity light spot from optical system 13 scans the segment, thereby causing positive charges to be trapped on the selenium surface of the drum, the amount of charge trapped at any one point corresponding to the amplitude of the analog voltage at the time the spot of light was incident at that point. As belt 11 moves on, the contact wheels move to the next segment, thereby leaving the previously deposited charges on the mated surfaces of the photoconductor and the dielectric. In this way, an entire electrostatic image is formed.

Referring now to pressure rollers 12, a positive potential is maintained on roller 12*a* and, therefore, an contacting surfaces 31*a* and 31*b*. Hence, when a segment 25 comes to pressure roller 12*a*, at which time belt 11 and drum 10 separate, the abovesaid positive potential is applied through elements 28*a* and 28*b* to the segment beneath. This reversal in the polarity of the electric field has the effect of preventing the image charges from leaving the drum surface during the separation. Consequently, the full strength of the image is retained.

Finally, as before, the latent image is processed in equipment 14 to produce the desired photoprint copy.

Although a number of particular arrangements of the invention have been illustrated and described above by way of example, it is not intended that the invention be limited thereto. Accordingly, the invention should be considered to include any and all modifications, alterations or equivalent arrangements falling within the scope of the annexed claims.

Having thus described the invention, what is claimed is:

1. A facsimile printer for converting a variable voltage corresponding to a video signal to an electrostatic image, said printer comprising: a rotating conductive drum whose lateral surface is coated with a photoconductive layer; a multilayered moving belt including a transparent conductive layer sandwiched between transparent dielectric and backing layers said belt being mounted so that a portion of it is in intimate contact with said photoconductive layer; means for applying the variable voltage between said drum and said conductive layer; and optical means for scanning the portion of said belt that is in contact with said photoconductive layer with a tiny spot of light of constant intensity.

2. The facsimile printer defined in claim 1 wherein said printer further includes apparatus for depositing a uniform positive charge on the surface of said photoconductive layer, said apparatus being mounted contiguous to said photoconductive layer and positioned so as to deposit said uniform positive charge thereon before said layer moves into contact with said belt.

3. In a facsimile printer, apparatus for converting a variable voltage corresponding to a video signal to an electrostatic image on a photoconductively coated drum, said apparatus comprising: a multi-layered moving belt including a transparent conductive layer sandwiched between transparent dielectric and backing layers, said belt being mounted so that a portion thereof is in intimate face-to-face contact with the photoconductive layer on the drum; means for applying the variable voltage between the drum and said conductive layer; and optical means for scanning said belt with a spot of light of constant intensity in the region where said belt and photoconductive layer is in contact.

4. A flexible belt for use in a facsimile printer in which a variable voltage applied between said belt and an electrically conductive drum is converted to an electrostatic image on a photoconductive layer coated on said drum when said belt and photoconductive layer are simultaneously scanned by a tiny spot of light of constant intensity, said belt comprising; a transparent dielectric layer; a transparent backing layer; a layer of transparent electrically conductive material sandwiched between said dielectric and backing layers; and electrically conductive means imbedded in said backing layer along the edges thereof in contact with said electrically conductive material.

5. The belt defined in claim 4 wherein said means includes a continuous strip of said material extending for the full length of the belt.

6. The belt defined in claim 4 wherein said means includes a row of conductive elements embedded along each edge of said backing layer, the elements in each row being equi-distantly spaced from each other.

7. A facsimile printer for converting a variable voltage corresponding to a video signal to a photo print, said printer comprising: a rotating conductive drum whose lateral surface is coated with a photoconductive layer; a multi-layered moving belt including a transparent conductive layer sandwiched between transparent dielectric and backing layers, said belt being mounted so that a portion thereof is contiguous to said photoconductive layer; means for applying the variable voltage between said drum and said conductive layer; optical means for scanning the contiguous portion of said belt with a tiny spot of light of constant intensity, whereby an electrostatic latent image is formed on the surface of said photoconductive layer; and equipment positioned contiguous to said photoconductive layer for converting said latent image to a permanent visible image on a paper medium.

8. A facsimile printer for converting a variable voltage corresponding to a video signal to an electrostatic image, said printer comprising: a capacitor having a pair of plates that move past a line therebetween at the same speed and in the same direction, the space between the plates of said capacitor being filled with a pair of dielectric layers that respectively move with said plates, one of said plates and the dielectric layer adjacent thereto being transparent and the other of said dielectric layers being made of a photoconductive material; means for applying the variable voltage between said pair of plates; and optical means for scanning said photoconductive dielectric layer along said line with a tiny spot of light of constant intensity that is projected through said transparent plate and dielectric layer, whereby said photoconductive dielectric layer becomes conductive in response to the light incident thereon to cause electric charge to become deposited on its surface whose magnitude corresponds to the amplitude of the applied voltage.

9. A facsimile printer for converting a variable voltage corresponding to a video signal to an electrostatic image, said printer comprising: a rotating conductive drum whose lateral surface is coated with a photoconductive layer; a multilayered moving belt including a transparent dielectric layer, a transparent backing layer, and a transparent segmented conductive layer sandwiched between said dielectric and backing layers, said conductive segments being separated from each other by narrow strips of a highly-resistive material, said belt being mounted so that a portion thereof is in intimate face-to-face contact with said photoconductive layer; means for applying the variable voltage between said drum and the segment in said conductive layer that is in face-to-face relationship with said photoconductive layer; optical means for scanning the portion of said belt that is in intimate face-to-face contact with said photoconductive layer with a tiny spot of light of constant intensity; and apparatus for reversing the polarity of the voltage applied to the segments of said conductive layer at the point in its path whereat said belt parts from said photoconductive layer.

10. The facsimile printer defined in claim 9 wherein said means includes electrically conductive elements embedded in said backing layer along the edges thereof in contact with the segments of said conductive layer, and a plurality of electrically conductive wheels mounted over said conductive elements and in contact therewith at the place whereat said belt is in intimate face-to-face contact with said photoconductive layer.

11. The facsimile printer defined in claim 10 wherein said apparatus includes a pressure roller whose lateral surface is in intimate contact with said belt backing layer, said roller having a pair of electrically conductive strips thereon in contact with said conductive elements.

12. A facsimile printer for converting a variable voltage corresponding to a video signal to a photo print, said printer comprising: a rotating conductive drum whose lateral surface is coated with a photoconductive layer; a multi-layered moving belt including a transparent dielectric layer, a transparent backing layer, and a transparent segmented conductive layer sandwiched between said dielectric and backing layers, said conductive segments being separated from said other by narrow strips of a highly-resistive material, said belt being mounted so that a portion thereof is contiguous to said photoconductive layer; means for applying the variable voltage between said drum and the segment in said conductive layer that is in a contiguous relationship with said photoconductive layer; optical means for scanning the portion of said belt that is contiguous to said photoconductive layer with a tiny spot of light of constant intensity, whereby an electrostatic latent image is formed on the surface of said photoconductive layer; apparatus for reversing the polarity of the voltage applied to the segments of said conductive layer whereat said belt separates from said conductive layer; and equipment positioned contiguous to said photoconductive layer for converting said latent image to a permanent visible image on a paper medium.

References Cited by the Examiner

UNITED STATES PATENTS 3,199,086 8/1965 Kallmann ----------- 178—6.6

DAVID G. REDINBAUGH, *Primary Examiner.*

H. W. BRITTON, *Assistant Examiner.*